United States Patent [19]

Baumberg

[11] Patent Number: 4,613,284

[45] Date of Patent: Sep. 23, 1986

[54] APPARATUS FOR ELEVATING LIQUIDS INCLUDING A VENTURI PIPE AND A LIQUID DELAY ELEMENT

[76] Inventor: Iosif Baumberg, 54 Bay 29 St., Brooklyn, N.Y. 11214

[21] Appl. No.: 771,908

[22] Filed: Sep. 3, 1985

[51] Int. Cl.⁴ .......................... F04B 23/04; F04F 5/00
[52] U.S. Cl. ....................................... 417/76; 417/87; 417/151; 417/198
[58] Field of Search ................... 417/76, 87, 151, 198, 417/503, 54, 196

[56] References Cited

U.S. PATENT DOCUMENTS

| | | | |
|---|---|---|---|
| 368,691 | 8/1887 | See ........................................ | 417/87 |
| 1,154,745 | 9/1915 | Browne ............................. | 417/76 X |
| 1,662,101 | 3/1928 | Bossi ................................ | 417/198 X |
| 2,120,858 | 6/1938 | Davant ................................ | 417/151 |

FOREIGN PATENT DOCUMENTS

| | | | |
|---|---|---|---|
| 864203 | 1/1953 | Fed. Rep. of Germany ...... | 417/151 |
| 2097485 | 11/1982 | United Kingdom ............... | 417/503 |

Primary Examiner—William L. Freeh
Assistant Examiner—Paul F. Neils
Attorney, Agent, or Firm—Ilya Zborovsky

[57] ABSTRACT

A wind pump has a liquid supply pipe connected with a convex pipe through a Venturi pipe open to wind, and a delivery pipe connected with the convex pipe and provided with a pumping-out element for elevating a liquid portion drawn into the convex pipe, and the pump is provided with a liquid supply delaying element for delaying the liquid supply from the inlet pipe into the convex pipe and subsequent completing the liquid portion in the latter during periods of weak wind. The delivery pipe is composed of a plurality of vertical pipe portions interconnected by intermediate accummulating container elements.

9 Claims, 3 Drawing Figures

APPARATUS FOR ELEVATING LIQUIDS INCLUDING A VENTURI PIPE AND A LIQUID DELAY ELEMENT

BACKGROUND OF THE INVENTION

The present invention relates to wind pumps and more particularly to wind pumps with a liquid supply pipe immersed in a liquid, a lower Venturi pipe connected with the liquid supply pipe and with a convex pipe for forming a liquid portion in the latter, and a pumping-out upper element for elevating the formed liquid portion along a delivery pipe connected by its lower end with the convex pipe and by its upper end with the pumping-out upper element.

A wind pump of this type is disclosed in the patent application Ser. No. 700,960 now U.S. Pat. No. 4,573,877. In this pump a liquid which accumulates in the convex pipe reduces the air flow in a system including the delivery pipe, the convex pipe and the lower Venturi pipe. As a result of this, when a wind velocity is lower than a certain value, the liquid is not elevated into the convex pipe to a sufficient extent and the liquid in the convex pipe cannot form a liquid portion which would completely close the cross section of the convex pipe, whereby the insufficient quantity of liquid in the convex pipe (such that does not close the cross section) is not elevated through the delivery pipe under the action of aspiration produced by the pumping-out element. Thus, the arrangement does not operate with a wind speed of lower velocities.

SUMMARY OF THE INVENTION

Accordingly, it is an object of the present invention to provide a wind pipe which avoids the disadvantages of the prior art and guarantees the operation of the pump even with very low wind velocites.

In keeping with these objects and with others which will become apparent hereinafter, one feature of the present invention resides, briefly stated, in a wind pump of the above mentioned type which is provided with means for delaying the liquid supply from a liquid supply pipe into a convex pipe.

The liquid supply delaying element can be arranged in the region between an outlet diffuser of a lower Venturi pipe and an inlet leg of the convex pipe.

The novel features of the present invention are set forth in particular in the appended claims. The invention itself, however, both as to its construction and its manner of operation will be best understood from the following description which is accompanied by the following drawings.

DESCRIPTION OF PREFERRED EMBODIMENTS

Figure 1:
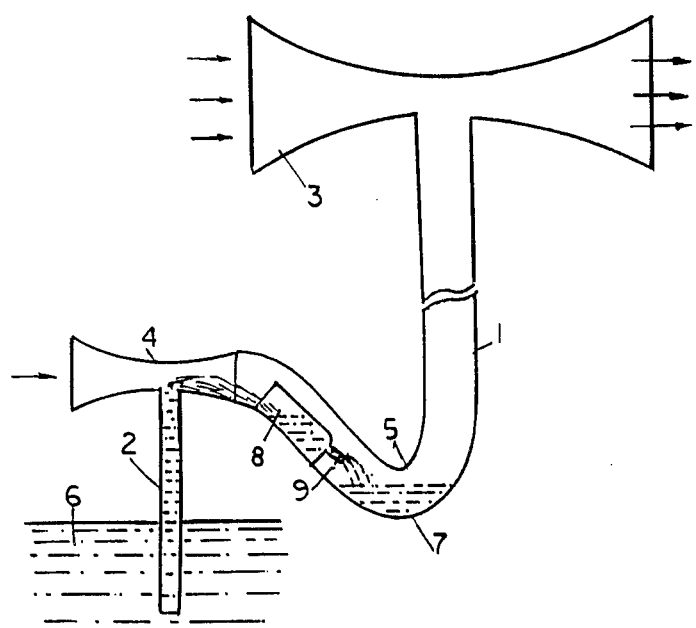
FIG. 1 is a schematic side view showing a wind pump in accordance with the present invention, with liquid supply delaying means.

A wind pump in accordance with the present invention has basic parts which correspond to the respective parts of the wind pump disclosed in the patent application Ser. No. 700,960 and which operate substantially the same way as in this application, incorated here by reference. More particularly, a liquid supply pipe 2 is immersed into a liquid source 6 and connected with a constriction of a lower Venturi pipe 4 which has inlet and outlet diffusers. The inlet diffuser is open for wind, while the outlet diffuser is connected with an upper end of a left leg of a convex pipe 5. The upper end of a right leg of the convex pipe 5 is connected with a delivery pipe 1 provided at its upper end with pumping-out means, for example an upper Venturi pipe or the like. A liquid is aspirated under the action of one or both Venturi pipes through the supply pipe into the convex pipe and a liquid portion 7 is formed in the latter and is elevated under the action of rarification created in the delivery pipe by the upper Venturi pipe. Then the liquid portion is discharged through the upper discharge end of the delivery pipe 1. The cycle repeats many times.

Figure 2:
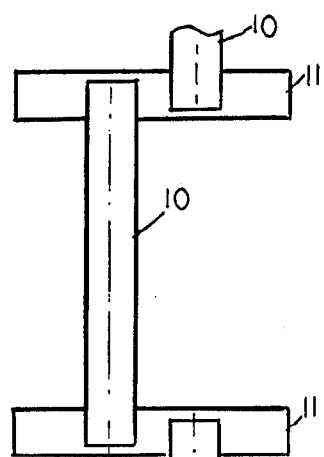
FIG. 2 is a view showing another embodiment of a delivery pipe of the wind pump in accordance with the present invention.
Figure 2:
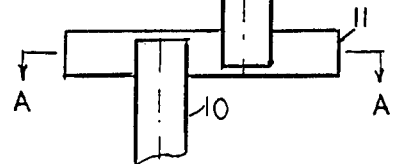

In deviation from the wind pump described in the above identified application, the wind pump in accordance with the present invention is provided with a liquid supply delaying element. In FIG. 2 it is formed as a small container with inlet and outlet openings of different liquid passage resistance. Other liquid supply delaying elements can be used, such as for example a whirling member formed as a whirling diode used in pneumatic-hydraulic automatic devices, etc. The container is identified with reference numeral 8 and is located, preferably, in the left leg of the convex pipe 5. The container is adjacent to the lower surface of the left leg and does not close completely the cross section of the convex pipe 5. The upper end which forms an inlet opening is completely open, while the lower end is formed by a small pipe 9 of a small cross section to form an outlet opening.

When the liquid is elevated from the liquid source 6 through the liquid supply pipe 2 and flows down into the convex pipe 6, it partially or completely flows through the container 8. When a certain amount of liquid is accumulated in the convex pipe 5 and it decreases the flow cross section in the convex pipe 5 so that the intensity of air flow is reduced to a value insufficient for further supply of liquid from the source 6 into the covex pipe 5, a remaining portion of liquid which has been delayed (accumulated) in the container 8 will flow from the latter into the convex pipe 5 so as to finalize the formation of a complete liquid portion which bridges the cross section of (closes) the convex pipe 5, whereby the liquid portion can be elevated through the delivery pipe 1.

Figure 3:
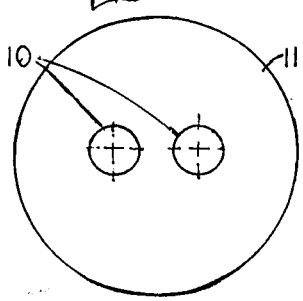
FIG. 3 is a plan view of the inventive delivery pipe of FIG. 2.

As can be seen from FIGS. 2 and 3 the delivery pipe can be composed of a plurality of substantially vertical pipe portions 10 connected with one another through intermediate containers 11. The pipe portion 10 can have equal lengths and arranged so that each upper pipe portion extends in the lower container to a minimum height, while the adjacent lower pipe portion extends into the same container to a maximum height. Gaps are left between the open ends of the adjacent pipes portions and the container to provide a flow of liquid from the lower pipe portion into the respective container and then from the latter into the respective upper pipe portion. This construction is especially favorable for situations when a wind is of interrupted nature with sharp changes of wind velocity. In the conventional wind pumps weakening of the wind velocity and the resulting weakening of the rarification in the delivery pipe will lead to downward falling of the liquid portion in the delivery pipe, instead of its elevation. This is eliminated in the delivery pipe 10,11.

Each intermediate container 11 has a height which is considerably smaller than the height of the pipe portion 10, and a volume which is equal or greater than the volume of the pipe portion 10.

The liquid portion formed in the convex pipe 5 is elevated by successive movements from each lower pipe portion into the respective upper pipe portion through the intermediate container. When the action of wind is weakened or interrupted completely, the elevated liquid portion remains in the connecting container between the pipe portions or falls from the respective pipe portion into the lower container. During resumption of wind action the elevation of the liquid is continued from the level at which it has stopped.

It is to be emphasized that instead of the upper Venturi pipe, jet pumps, injecting nozzles, steam pipes etc can be used. Instead of wind, also it is possible to use the motive power of discharged gas or steam.

The invention is not limited to the details shown since various modifications and structural changes are possible without departing in any way from the spirit of the present invention.

What is desired to be protected by Letters Patent is set forth in particular in the appended claims:

1. A wind pump, comprising
   a supply pipe having a lower end to be immersed into liquid, and an upper end;
   a substantially horizontal Venturi pipe having a constriction connected with said upper end of said supply pipe, an inlet diffuser for entering wind, and an outlet diffuser;
   a convex pipe having an inlet connected with said outlet diffuser of said Venturi pipe, and an outlet so that a liquid is drawn from the liquid source through said supply pipe and said Venturi pipe into said convex pipe;
   a delivery pipe having a lower end connected with said convex pipe and an upper end;
   pumping out means connected with said upper end of said delivery pipe and forming rarification in the latter so as to elevate the liquid through and discharge the liquid from said delivery pipe, said liquid being raised in said delivery pipe in the form of a composite column of liquid portions and air;
   and liquid supply delaying means located within said convex pipe between said outlet diffuser of said Venturi pipe and a bottom curve of said convex pipe and arranged to accumulate a part of the liquid flowing from said supply pipe into said convex pipe, and when a cross section of said convex pipe is not completely filled with the liquid, to supply the accumulated part of the liquid into said convex pipe so as to completely fill the cross section of said convex pipe.

2. A wind pump as defined in claim 1, herein said convex pipe has an upstream leg and a downstream leg, said liquid supply delaying means being arranged in said upstream leg of said convex pipe.

3. A wind pump as defined in claim 1, wherein said liquid supply delaying means is formed as a container with an inlet opening of smaller liquid resistance and an outlet opening of a larger liquid resistance.

4. A wind pump as defined in claim 1, wherein said pumping out means includes a further Venturi pipe having a constriction, an inlet diffuser for entering wind, and an outlet diffuser, said upper end of said delivery pipe being connected with said constriction of said further Venturi pipe.

5. A wind pump as defined in claim 1, wherein said delivery pipe includes a plurality of substantially vertical pipe portions and a plurality of intermediate liquid accumulating portions each connecting two adjacent ones of said vertical pipe portions.

6. A wind pump as defined in claim 5, wherein said vertical pipe portions have equal lengths.

7. A wind pump as defined in claim 5, wherein said accumulating portions are formed as substantially horizontal container elements.

8. A wind pump comprising a supply pipe having a lower end to be immersed into a liquid, and an upper end; a Venturi pipe having a constriction connected with said upper end of said supply pipe, an inlet diffuser for entering wind, and an outlet diffuser; a convex pipe having an inlet connected with said outlet diffuser of said Venturi pipe, and an outlet so that a liquid is drawn from the liquid source through said supply pipe and said Venturi pipe into said convex pipe; a delivery pipe having a lower end connected with said convex pipe and an upper end, said delivery pipe including a plurality of substantially vertical pipe portions and a plurality of intermediate liquid accumulating portions formed as substantially horizontal container elements and each connecting two adjacent ones of said vertical pipe portions, said vertical pipe portions being arranged so that each vertical pipe portion located above a respective one of said container elements extends into the latter to a minimum height, while an adjacent one of said vertical pipe portions extends into the same container element to a maximum height and so that gaps remain between said two vertical pipe portions and said respective container element; pumping out means connected with said upper end of said delivery pipe and forming rarification in the latter so as to elevate the liquid through and discharge the liquid from said delivery pipe, said liquid being raised in said delivery pipe in the form of a composite column of liquid portions and air.

9. A wind pump as defined in claim 8; and further comprising liquid delaying means arranged to delay flowing of the liquid from said supply pipe into said convex pipe.

* * * * *